ABSTRACT
United States Patent [19]

Goel

[11] Patent Number: 4,601,995

[45] Date of Patent: Jul. 22, 1986

[54] ORGANO TIN CATALYSTS MODIFIED WITH BICYCLIC AMIDE ACETALS

[75] Inventor: Anil B. Goel, Worthington, Ohio

[73] Assignee: Ashland Oil, Inc., Ashland, Ky.

[21] Appl. No.: 794,988

[22] Filed: Nov. 4, 1985

[51] Int. Cl.$^4$ .......................... B01J 31/04; B01J 31/12
[52] U.S. Cl. ................................... 502/155; 502/167; 528/54
[58] Field of Search .............................. 502/155, 167

[56] References Cited

U.S. PATENT DOCUMENTS

| | | | |
|---|---|---|---|
| 3,732,176 | 5/1973 | Hostettler et al. | 502/155 X |
| 4,115,320 | 9/1978 | Meyborg | 502/155 |
| 4,122,038 | 10/1978 | Sandner et al. | 502/155 |
| 4,473,662 | 9/1984 | Hira et al. | 502/155 |
| 4,547,478 | 10/1985 | Chang | 502/155 X |

FOREIGN PATENT DOCUMENTS 1204100 9/1970 United Kingdom ................ 502/155

*Primary Examiner*—Patrick P. Garvin
*Attorney, Agent, or Firm*—John F. Jones

[57] ABSTRACT

An improved catalyst for the preparation of polyurethanes and in other tin catalyzed reactions is prepared by modifying an organo tin compound, such as dibutyl tin dimethoxide, with a bicyclic amide acetal.

14 Claims, No Drawings

ORGANO TIN CATALYSTS MODIFIED WITH BICYCLIC AMIDE ACETALS

This invention relates to improved organo tin catalysts and to a method for their preparation and more particularly pertains to organo tin catalysts modified by treatment with bicyclic amide acetals and to the method for their modification.

The improved organo tin catalysts of this invention are useful in catalyzing the reaction between polyols and polyisocyanates to form polyurethanes and in other types of reactions which normally require the use of organo tin catalysts.

Most of the organo tin carboxylates used as catalysts in the polyol/polyisocyanate polymerization have been known to undergo slow degradation, thus losing with time, their catalytic activities. Modification by interacting with small amounts of bicyclic amide acetal provides improved catalytic activity and long life to these catalysts.

The organo tin catalysts embodied in this invention include organotin (IV) carboxylates, organo tin (II) carboxylates, organo tin alkoxides, organotin dialkyl acids, organotin alkyl mercapto acids and the like.

The bicyclic amide acetals useful in this invention include those conforming to Formula I:

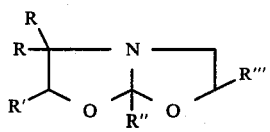

wherein R, R', R" and R''', independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

Organo tin (IV) carboxylates and tin (II) carboxylates most commonly used as catalysts for the polymerization of polyols and polyisocyanates to produce polyurethane polymers have been known to degrade and suffer loss of activity. This may be due to the possible hydrolysis and air oxidation of these organotin complexes. Some of the organo tin carboxylates and organotin alkoxides (e.g. dibutyltin dimethoxide) on the other hand show lower catalytic activity due to their immiscibility with various polyols.

I have discovered that the addition of small amounts of a bicyclic amide acetal to organo tin catalysts results in improvement in the catalytic activity as well as the stability of these catalysts. Furthermore, the use of bicyclic amide acetals in the modification of the organo tin catalysts results in an improvement in the compatibility and solubility properties of the catalysts in the polyol/polyisocyanate system.

The improvement in catalytic properties associated with the modification of organo tin catalysts with bicyclic amide acetals in accordance with this invention is believed to be related to (1) synergistic catalytic effect of organo tin catalyst as well as bicyclic amide acetal with the organo tin, thus causing stabilization of the catalyst against hydrolysis, etc., (3) removal of free acid produced in the degradation of the organotin carboxylate by reaction and conversion to eter-ol, and (4) improvement in the solubility properties of the organo tin complexes. In a typical example, when dibutyltin dimethoxide which catalyzed the poly(propylene oxide) diol (molecular weight of 400) reaction with liquid methylene bis(phenyl isocyanate) (about 0.1% catalyst used) to give polymer in about 6 minutes, upon mixing with 25% by weight based on dibutyltin dimethoxide, provided polymer in less than three minutes. Similarly, an old sample of dibutyltin dilaurate having catalytic activity towards the above reaction mixture of 3.5 minutes (0.1% catalyst), when treated with 25% of bicyclic amide acetal, resulted in the formation of a catalyst solution which catalyzed the above reaction to give polymer in less than two minutes. It has been further found that the organotin oxide, the probable hydrolysis product of the organotin alkoxides or carboxylates, reacts readily with bicyclic amide acetal to give a new Sn-O-C containing molecule which also shows catalytic activity in the polyol/polyisocyanate reactions. Thus, the organo tin compounds mixed with bicyclic amide acetals exhibit excellent catalytic activity even after exposure to the atmosphere.

In the process of this invention from about 2 to 95 weight % of the bicyclic amide acetal is used per weight of the organo tin compound to produce the modified organo tin catalyst compositions of this invention. The process for reaction of the bicyclic amide acetal with the organo tin catalyst of this invention may be carried out at a temperature in the range of from 10° to 200° C. and at a pressure of from 1 to 100 atmospheres.

The invention is further illustrated in the following representative examples.

EXAMPLE 1

This example is for comparative purposes and is outside the scope of this invention. To 7.0 g of poly(propylene oxide) diol (molecular weight of 400) was added 0.01 g of dibutyltin dimethoxide. To this mixture was then added 5.2 g of liquid methylene bis(phenyl isocyanate) with rapid mixing for ten seconds and then a thermocouple was immersed into the mixture to monitor the exotherm (gelation or rapid polymer formation). The gel time was observed and was considered to be the time of maximum exotherm which in this particular case was found to be 6 minutes.

EXAMPLE 2

A solution of dibutyltin dimethoxide (4 g) and bicyclic amide acetal of Formula I wherein R, R' and R''' represent hydrogen and R" represents methyl (1.0 g) was prepared and 0.01 g of this solution was mixed with 7.0 g of the diol described in Example 1. The resulting solution was mixed with 5.2 g of liquid methylene bis(phenyl isocyanate) and the gel time determined in accordance with the procedure described in Example 1 was found to be 2.5 minutes.

EXAMPLE 3

This example is for comparative purposes and is outside the scope of this invention. The procedure of Example 1 was followed using 7.0 g of the diol, 0.013 g of dibutyltin dilaurate and 5.2 g of the diisocyanate. The gel time was found to be 2.5 minutes.

EXAMPLE 4

A solution of 4.0 g of dibutyltin dilaurate and 1.0 g of the bicyclic amide acetal described in Example 2 was prepared. A part of this solution (0.014 g) was mixed with 7.0 g of the diol of Example 1 and the resulting solution was mixed with 5.2 g of liquid methylene bis(phenyl isocyanate). The procedure of Example 1 was followed and the gel time was found to be 2 minutes. The above prepared catalyst solution, upon storing at room temperature overnight, resulted in phase separation to give two layers. The infrared spectrum of the bottom layer showed strong bands at 3350 cm$^{-1}$ (hydroxyl group) and 1730 cm$^{-1}$ (ester group) indicating the formation of ester-ol probably by the reaction of free carboxylic acid in the sample of dibutyltin dilaurate with the bicyclic amide acetal. The infrared spectrum of the commercial sample of dibutyltin dilaurate showed medium intensity band at 1700 cm$^{-1}$ and broad band in the region of 3300-3100 cm$^{-1}$ indicating the presence of free carboxylic acid. The top layer (major amount) showed no infrared bands in the region of 3000-3500 cm$^{-1}$ or at 1700 cm$^{-1}$ suggesting the absence of any free acid. The top layer when used as catalyst (0.014 g) for 7.0 g of the diol and 5.2 g of liquid methylene bis(phenyl isocyanate) gave a gel time of less than 2 minutes. The same catalyst when used after six weeks standing showed good catalytic activity in the same polyurethane system giving a gel time (0.01 g of catalyst) of 2.75 minutes.

EXAMPLE 5

A solution of tin (II) octoate (2.0 g) and 0.5 g of the bicyclic amide acetal of Example 2 was prepared by mixing. The infrared spectrum for this mixture showed medium intensity bands at 3350 cm$^{-1}$ (hydroxyl groups) and 1740 cm$^{-1}$ (carboxylate ester groups) suggesting the formation of ester-ol. The band at 1700 cm$^{-1}$ present in the tin (II) octoate before treatment with the bicyclic amide acetal was not found in the solution. A part of this solution (0.01 g) was mixed with 7.0 g of the diol described in Example 1 and the mixture was polymerized with 5.2 g of liquid methylene bis(phenyl isocyanate). The gel time, in accordance with the procedure of Example 1, was found to be 1 minute. The catalyst was stored at room temperature in a closed container for six weeks and then was exposed to the atmosphere for three hours. A part of this catalyst (0.015 g) was then used with 7.0 g of diol and 5.2 g of liquid methylene bis(phenyl isocyanate) and the gel time was observed to be 2 minutes. In comparison, the tin (II) octoate sample, per se, was exposed to the atmosphere for three hours and when tested in a similar manner as catalyst showed a gel time of 4.5 minutes. This shows that the use of the bicyclic amide acetal to modify the organo tin catalyst results in improved stability and activity of the catalyst.

EXAMPLE 6

A dibutyltin dialkyl acid (T-125 from M&T Chemicals) (4.0 g) was mixed with 1 g of the bicyclic amide acetal of Example 2. Part of this solution (0.013 g) was mixed with 7.0 g of the diol of Example 1 and the mixture, upon treating with 5.2 g of liquid methylene bis(phenyl isocyanate) gelled in less than two minutes following the procedure of Example 1. The gel time was shorter than that compared with the use of the dibutyltin dialkyl acid itself even when the latter was used at a higher level (0.017 g of unmodified catalyst gave a gel time of 2.5 minutes).

EXAMPLE 7

A dialkyltin alkyl mercapto acid (T-131 from M&T Chemicals) (2.0 g) was mixed with 0.5 g of the bicyclic amide acetal of Example 2. Part of this solution (0.14 g) was mixed with 7 g of the diol of Example 1 and was then treated with 5.3 g of liquid methylene bis(phenyl isocyanate). The mixture gelled in 2.5 minutes. The dialkyltin alkyl mercapto acid itself when used in this procedure showed a gelation time of 3 minutes.

EXAMPLE 8

Dibutyltin oxide (5 g) powder was mixed with 10 g of the bicyclic amide acetal of Example 2. The resulting mixture was heated at 100° C. for five hours under constant stirring to give a clear orange/yellow solution. The infrared spectrum of the solution showed the presence of a strong band at 1630 cm$^{-1}$ (amide group) and weak-to-medium band at 1730 cm$^{-1}$ (carboxylate ester group). The solution was found to be unchanged for over two months standing (at room temperature in closed container). Part (0.5 g) of this solution was mixed with 7 g of the diol of Example 1 and the solution was treated with 6.2 g of the diisocyanate of Example 1. The mixture was found to gel in about four minutes.

I claim:

1. An improved catalyst composition comprising an organo tin compound modified by reaction with a bicyclic amide acetal.

2. The composition of claim 1 wherein the organo tin compound is selected from the group consisting of organo tin (IV) carboxylates, organo tin (II) carboxylates, organo tin alkoxides, organo tin dialkyl acids and organo tin alkyl mercapto acids.

3. The composition of claim 1 wherein the bicyclic amide acetal is one conforming to the formula

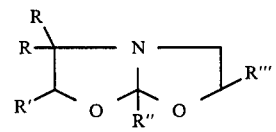

wherein R, R', R" and R'" independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

4. The composition of claim 3 prepared from about 2 to 95% by weight of the bicyclic amide acetal based on the weight of the organo tin compound.

5. The composition of claim 4 prepared at a temperature in the range of from 10° to 200° C. and a pressure of from 1 to 100 atmospheres.

6. The composition of claim 5 wherein the organo tin compound is dibutyl tin dimethoxide and the bicyclic amide acetal is one in which R, R' and R'" represent hydrogen and R" represents methyl.

7. The composition of claim 5 wherein the organo tin compound is dibutyl tin dilaurate and the bicyclic amide acetal is one in which R, R' and R'" represent hydrogen and R" represents methyl.

8. The composition of claim 5 wherein the organo tin compound is tin (II) octoate and the bicyclic amide acetal is one in which R, R', and R'" represent hydrogen and R" represents methyl.

9. The composition of claim 5 wherein the organo tin compound is a dibutyl tin dialkyl acid and the bicyclic amide acetal is one in which R, R' and R''' represent hydrogen and R'' represents methyl.

10. The composition of claim 5 wherein the organo tin compound is dibutyl tin oxide and the bicyclic amide acetal is one in which R, R' and R''' represent hydrogen and R'' represents methyl.

11. The process for preparing an improved catalyst comprising treating an organo tin compound with a bicyclic amide acetal at a temperature in the range of from 10° to 200° C. and at a pressure of from about 1 to 100 atmospheres.

12. The process of claim 11 wherein from about 2 to 95% by weight of the bicyclic amide acetal based on the weight of the organo tin compound is employed.

13. The process of claim 12 wherein the organo tin compound is selected from the group consisting of organo tin (IV) carboxylates, organo tin (II) carboxylates, organo tin alkoxides, organo tin dialkyl acids and organo tin alkyl mercapto acids.

14. The process of claim 12 wherein the bicyclic amide acetal is one conforming to the formula

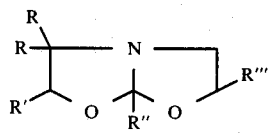

wherein R, R', R'' and R''' independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

* * * * *